(12) United States Patent
Hrycak et al.

(10) Patent No.: US 8,755,429 B2
(45) Date of Patent: Jun. 17, 2014

(54) METHOD FOR CHANNEL EQUALIZATION

(75) Inventors: Tomasz Hrycak, Vienna (AT);
Saptarshi Das, Bangalore (IN); Hans Georg Feichtinger, Mistelbach (AT); Gerald Matz, Vienna (AT)

(73) Assignees: Universitat Wien, Vienna (AT);
Technische Universitat Wien, Vienna (AT)

( * ) Notice: Subject to any disclaimer, the term of this patent is extended or adjusted under 35 U.S.C. 154(b) by 149 days.

(21) Appl. No.: 13/582,515

(22) PCT Filed: Mar. 4, 2011

(86) PCT No.: PCT/AT2011/000110
§ 371 (c)(1),
(2), (4) Date: Sep. 4, 2012

(87) PCT Pub. No.: WO2011/106819
PCT Pub. Date: Sep. 9, 2011

(65) Prior Publication Data
US 2012/0327994 A1 Dec. 27, 2012

(30) Foreign Application Priority Data
Mar. 4, 2010 (EP) .................................... 10450034

(51) Int. Cl.
*H03H 7/30* (2006.01)
(52) U.S. Cl.
USPC ......................................................... 375/233
(58) Field of Classification Search
USPC ........................... 375/229, 230, 231, 232, 233
See application file for complete search history.

(56) References Cited

U.S. PATENT DOCUMENTS 8,521,488 B2 *  8/2013  Kirby et al. ...................... 703/2

FOREIGN PATENT DOCUMENTS

EP       2 228 955 A1      9/2010

OTHER PUBLICATIONS

David J. Thomson, *Spectrum Estimation and Harmonic Analysis*, Proceedings of the IEEE, vol. 7, No. 9, Sep. 1982, pp. 1055-1096.
I. Barhumi et al., "Time-Varying FIR Equalization for Doubly Selective Channels", IEEE Transactions on Wireless Communications, vol. 4, No. 1, Jan. 2005.
Imad Barhumi, et al., "MLSE and MAP Equalization for Transmission Over Doubly Selective Channels", IEEE Transactions on Vehicular Technology, vol. 58, No. 8, Oct. 2009.
International Search Report dated Aug. 12, 2010, issued in corresponding International Application No. 10450034.0-1525.

(Continued)

*Primary Examiner* — Jaison Joseph
(74) *Attorney, Agent, or Firm* — Stein IP, LLC

(57) ABSTRACT

A method of equalizing a signal received over transmission channel defined by BEM coefficients of a basis expansion model of its channel taps, comprising the step of approximately solving the relation (I) for x[n] by an iterative method, n being the index of time, y[n] being the received signal, x[n] being the equalized signal, $B_m[n]$ being the mth basis function of the basis expansion model, M being the model order of the basis expansion model, and $b_{lm}$ being the BEM coefficient of the mth of the basis function of the lth channel tap, and w[n] being optional noise.

$$y[n] = \sum_{m=0}^{M} B_m[n] \cdot \left( \sum_{l=0}^{L-1} b_{lm} x[n-l] \right) + w[n] \qquad (I)$$

12 Claims, 6 Drawing Sheets

(56) References Cited

OTHER PUBLICATIONS

Åke Björck, *Numerical Methods for Least Squares Problems*, Society for Industrial and Applied Mathematics, 1996, title pages and pp. 303-311 and 334-335.
Chi-Min Li, et al., *Performance Analysis of Different HSDPA Equalizers Under the Measured Outdoor Channels*, Proc. 2007 Int'l Symp. On Intelligent Signal processing and Communications Systems, IEEE, 2007, pp. 794-797.
Tomasz Hrycak, et al., *Practical Estimation of Rapidly Varying Channels for OFDM Systems*, IEEE Transactions on Communications, vol. 59, No. 11, Nov. 2011, pp. 3040-3048.
John A.C. Bingham, *Multicarrier Modulation for Data Transmission: An Idea Whose Time Has Come*, IEEE Communications Magazine, May 1990, pp. 5-8 and 11-14.
Hang Zhang, et al., *Optimal Channel Estimation for MIMO/OFDM Systems in Time-varying Wireless Channels*, IEEE, 2008, pp. 288-291.
Thomas Zemen, et al., *Time-Variant Channel Equalization via Discrete Prolate Spheroidal Sequences*, 2003, pp. 1288-1,292.
Sinem Coleri, et al., *Channel Estimation Techniques Based on Pilot Arrangement in OFDM Systems*, IEEE Transactions on Broadcasting, vol. 48, No. 3, Sep. 2002, pp. 223-229.
Tomasz Hrycak et al., *A Method for Channel Equalization*, 39 pages, 2010.
David Gottlieb, et al., *On the Gibbs Phenomenon and its Resolution*, SIAM Review, No. 39, No. 7, Dec. 1997, pp. 644-668.
Tobin A. Driscoll, et al., *A Padé-based algorithm for overcoming the Gibbs phenomenon*, Numerical Algorithms, vol. 26, 2001, pp. 77-92.
Neal C. Gallagher, et al., *A Novel Approach for the Computation of Legendre Polynomial Expansions*, IEEE Transactions on Acoustics, Speech, and Signal Processing, vol. ASSP-26, No. 1, Feb. 1978, pp. 105-106.
Bernie D. Shizgal, et al., *Towards the resolution of the Gibbs phenomena*, Journal of Computational and Applied Mathematics, vol. 161, 2003, pp. 41-65.
M. Abramowit, et al., *Handbook of Mathematical Functions With Formulas, Graphs, and Mathematical Tables*, Dec. 1972, 11 pages.
William C. Jakes, *Multipath Interferences*, Chapter 1 in William C. Jakes, ed, *Microwave Mobile Communications*, IEEE, Inc., 1974, title, table of contents, and pp. 11-78.
Tomasz Hrycak, et al., *Low Complexity Equalization for Doubly Selective Channels Modeled by a Basis Expansion*, IEEE Transactions on Signal Processing, vol. 58, No. 11, Nov. 2010, pp. 5706-5719.
European Search Report dated Aug. 12, 2010, issued in corresponding European Application No. 10450035.0-1525.
Eitan Tadmor, *Filters, mollifiers and the computation of the Gibbs phenomenon*, Acta Numerica, 2007, pp. 305-379.
John P. Boyd, *Chebyshev and Fourier Spectral Methods*, Second Edition, 2000, 611 pages.
I.S. Gradshteyn, et al., *Table of Integrals, Series, and Products*, seventh Edition, 2007, Ii and 1171 pages.
David J. Thomson, *Spectrum Estimation and Harmonic Analysis*, Proceedings of the IEEE, vol. 70, No. 9, Sep. 1982, pp. 1055-1096.
U.S. Appl. No. 13/582,509, filed Sep. 4, 2012, Tomasz Hrycak, et al., Assignee 1) Universitaet Wien 2) Technische Universitaet Wien.
U.S. Appl. No. 13/738,591, filed Jan. 10, 2013, Saptarshi Das, et al., Assignee 1) University of Vienna.
Imad Barhumi, et al., *Time-Varying FIR Equalization for Doubly Selective Channels*, IEEE Transactions on Wireless Communications, vol. 4, No. 1, Jan. 2005, pp. 202-214.
Imad Barhumi, et al., *MLSE and MAP Equalization for Transmission Over Doubly Selective Channels*, IEEE Transactions on Vehicular Technology, vol. 58, No. 8, Oct. 2009, pp. 4120-4128.
European Search Report dated Aug. 12, 2010, issued in corresponding European Application No. 10450034.3-1525.
Thomas Zemen, et al., *Time-Variant Channel Estimation Using Discrete Prolate Spheroidal Sequences*, IEEE Transactions on Signal Processing, vol. 53, No. 9, Sep. 2005, pp. 3597-3607.
Zijian Tang, et al., *Pilot-Assisted Time-Varying Channel Estimation for OFDM Systems*, IEEE Transactions on Signal Processing, vol. 55, No. 5, May 2007, pp. 2226-2238.
Zijian Tang, et al., *Pilot Schemes for Time-Varying Channel Estimation in OFDM Systems*, 2007, 5 pages.
Changyong Shin, et al., *An Efficient Design of Doubly Selective Channel Estimation for OFDM Systems*, IEEE Transactions on Wireless Communications, vol. 6, No. 10, Oct. 2007, pp. 3790-3802.
Hrycak, *A Method for Channel Estimation*, 26 pages.
Kun Fang, et al., *Low-Complexity Block Turbo Equalization for OFDM Systems in Time-Varying Channels*, IEEE Transactions on Signal Processing, vol. 56, No. 11, Nov. 2008, pp. 5555-5565.
Hakan A. Cirpan, et al., *Maximum Likelihood Blind Channel Estimation in the Presence of Doppler Shifts*, IEEE Transactions on Signal Processing, vol. 47, No. 6, Jun. 1999, pp. 1559-1569.
Maxime Guillaud, et al., *Channel Modeling and Associated Inner-Carrier Interference Equalization for OFDM Systems with High Doppler Spread*, 2003, pp. 237-240.
Geert Leus, *On the Estimation of Rapidly Time-Varying Channels*, 4 pages.
Thomas Zemen, et al., *Time-Variant Channel Equalization via Discrete Prolate Spheroidal Sequences*, Downloaded Mar. 2, 2010, pp. 1288-1292.
Dev K. Borah, et al., *Frequency-Selective Fading Channel Estimation with a Polynomial Time-Varying Channel Model*, IEEE Transactions on Communications, vol. 47, No. 6, Jun. 1999, pp. 862-873.
Arun P. Kannu, et al., *MSE-Optimal Training for Linear Time-Varying Channels*, 4 pages.
Arun P. Kannu, et al., *Design and Analysis of MMSE Pilot-Aided Cyclic-Prefixed Block Transmissions for Doubly Selective Channels*, IEE Transactions on Signal Processing, vol. 56, No. 3, Mar. 2008, pp. 1148-1160.
T. Zemen, et al., *Time Variant Channel Equalization for MC-CDMA via Fourier Basis Functions*, 2003, pp. 1-8.
Patrick Roberton et al., *The Effects of Doppler Spreads in OFDM (A) Mobile Radio Systems*, 1999, pp. 329-333.
Ye (Geoffrey) Li, et al., *Bounds on the Interchannel Interference of OFDM in Time-Varying Impairments*, IEEE Transactions on Communications, vol. 49, No. 3, Mar. 2001, pp. 401-404.
Mark Russell, et al., *Interchannel Interference Analysis of OFDM in a Mobile Enviornment*, 1995, pp. 820-824.
Yang-Seok Choi, et al., *On Channel Estimation and Detection for Multicarrier Signals in Fast and Selective Rayleigh Fading Channels*, IEEE Transactions on Communications, vol. 49, No. 8, Aug. 2001, pp. 1375-1387.
Xiaodong Cai, et al., *Bounding Performance and Suppressing Intercarrier Interference in Wireless Mobile OFDM*, IEEE Transactions on Communications, vol. 51, No. 12, Dec. 2003, pp. 2047-2056.
Alexei Gorokhov, et al., *Robust OFDM Receivers for Dispersive Time-Varying Channels: Equalization and Channel Acquisition*, IEEE Transactions on Communications, vol. 52, No. 4, Apr. 2004, pp. 572-583.
Luca Rugini, et al., *Simple Equalization of Time-Varying Channels for OFDM*, IEEE Communications Letters, vol. 9, No. 7, Jul. 2005, pp. 619-621.
Philip Schniter, *Low-Complexity of OFDM in Doubly Selective Channels*, IEEE Transactions on Signal Processing, vol. 52, No. 4, Apr. 2004, pp. 1002-1011.
Georg Taubock, et al. *LSQR-Based ICI Equalization for Multicarrier Communications in Strongly Dispersive and Highly Mobile Environments*, 2007, 5 pages.
Tomasz Hrycak, et al., *Low-Complexity Time-Domain ICI Equalization for OFDM Communications over Rapidly Varying Channels*, pp. 1767-1771.
Youcef Saad, et al., *GMRES: A Generalized Minimal Residual Algorithm for Solving Nonsymmetric Linear Systems*, SIAM J. Sci. Stat. Comput., vol. 7, No. 3, Jul. 1986, pp. 856-869.
Christopher C. Paige, et al., *LSQR: An Algorithm for Sparse Linear Equations and Sparse Least Squares*, ACM Transactions on Mathematical Software, vol. 8, No. 1, Mar. 1982, pp. 43-71.
Arnold Neumaier, *Solving Ill-Conditioned and Singular Linear Systems: A Tutorial on Regularization*, SIAM Rev., vol. 40, No. 3, Sep. 1998, pp. 636-666.

(56) References Cited

OTHER PUBLICATIONS

Michail K. Tsatsanis et al., *Modelling and Equalization of Rapidly Fading Channels*, International J. of Adaptive Control and Signal Processing, vol. 10, pp. 159-176, 1996.

Georgios B. Giannakis, et al., *Basis Expansion Models and Diversity Techniques for Blind Identification and Equalization of Time-Varying Channels*, Proceedings of the IEEE, vol. 86, No. 10, Oct. 1998, pp. 1969-1986.

Luca Rugini, et al., *Low-Complexity Banded Equalizers for OFDM Systems in Doppler Spread Channels*, EURASIP J. Applied Signal Processing, 2006, pp. 13 pages.

IEEE Computer Society, et al. *Part 16: Air Interface for Fixed and Mobile Broadband Wireless Access Systems. Amendment 2: Physical and Medium Access Control Layers for Combined Fixed and Mobile Operation in Licensed Bands*, Feb. 28, 2006, 864 pages.

Gene H. Golub, et al., *Matrix Computations: Third Edition*, 1996, 169 pages.

\* cited by examiner (a)

(b)

(a)

(b)

(a)

(b)

METHOD FOR CHANNEL EQUALIZATION

INTRODUCTION

1. Field of the Invention

The present invention relates to a method of equalizing a signal received over a transmission channel defined by BEM coefficients of a basis expansion model of its channel taps.

2. Background of the Invention

In the last two decades, there has been a steady increase in the number of applications operating in rapidly varying wireless communication channels. Such channels occur due to user mobility in systems like DVB-T and WiMAX, which have been originally designed for fixed receivers. Rapidly varying channels lead to significant intercarrier interference (ICI) in multicarrier communication systems, which must be mitigated by an appropriate equalization method. Moreover, several applications have short symbol durations, and therefore require fast equalization algorithms. One such application is the mobile WiMAX (IEEE 802.16e) with a symbol duration of 102.9 µs.

At present, the most accurate approximations of doubly-selective wireless channels are obtained via the basis expansion model (BEM). Hence in the present disclosure, it is assumed that the channel is represented in terms of a basis expansion model (BEM), which approximates the channel taps by linear combinations of prescribed basis functions, see [1, 2], [3, 4]. In this context, channel estimation amounts to an approximate computation of coefficients for the basis functions. There exist several methods for estimating the BEM coefficients of doubly selective channel taps, especially with an orthogonal frequency-division multiplexing (OFDM) transmission setup, see [2, 3, 4]. Usually, the channel matrix is reconstructed from estimated BEM coefficients and subsequently used in equalization, see e.g. [6]. However, there does not exist an equalization method applicable to arbitrary bases, which uses the BEM coefficients directly without creating the channel matrix.

The complex exponential BEM (CE-BEM) [7, 8] uses a truncated Fourier series, and the resulting approximate channel matrix is banded in the frequency domain. A more suitable exponential basis—complex exponentials oversampled in the frequency domain—is employed by the generalized CEBEM (GCE-BEM) [9]. A basis of discrete prolate spheroidal wave functions is discussed in [1, 10]. Finally, the polynomial BEM (P-BEM) is presented in [11]. For channels varying on the scale of one symbol duration, pilot-aided channel estimation is studied in [2]. Definitive references on pilot-aided transmission in doubly selective channels are [12, 13].

Choosing an appropriate basis is crucial for accuracy, especially at high Doppler spreads. For example, discrete prolate sequences (DPS) provide a superb approximation, while complex exponentials (CE) give a poor approximation for several reasons, see e.g. [14].

For frequency-selective channels, the conventional single-tap equalization in the frequency domain is a method of choice. However, in the presence of severe ICI, single-tap equalization is unreliable, see [15, 16, 17]. Several other approaches have been proposed to mitigate ICI in transmissions over rapidly varying channels. For example, [18] describes minimum mean-square error (MMSE) and successive interference cancellation equalizers, which use all subcarriers simultaneously. Another equalizer is presented in [19]. However, with K OFDM subcarriers, it has the complexity of $O(K^2)$, and storage requirements of the same order of magnitude. Alternatively, only a few selected subcarriers are used in equalization, which amounts to approximating the frequency-domain channel matrix by a banded matrix. This approach has been exploited for design of low-complexity equalizers, see [6, 20, 21, 22, 23]. In Appendix C, it is demonstrated that approximation with a channel matrix banded in the frequency domain is equivalent to using a BEM with complex exponentials (CE-BEM). However, the CE-BEM [22] provides a poor approximation to the channel matrix [14, 10], so this approach leads to a significant loss of information about the channel. A time-domain equalizer based on the LSQR algorithm is introduced in [24].

OBJECT OF THE INVENTION

It is an object of the invention to devise a method of equalizing a signal received over a transmission channel defined by BEM coefficients with less computational and less memory requirements for a given accuracy than the state of the art.

SUMMARY OF THE INVENTION

According to the invention this object is achieved with a method of equalizing a signal received over a transmission channel defined by BEM coefficients of a basis expansion model of its channel taps, comprising the step of approximately solving the relation $$y[n] = \sum_{m=0}^{M} B_m[n] \cdot \left( \sum_{l=0}^{L-1} b_{lm} x[n-l] \right) + w[n]$$

for x[n] by an iterative method,
n being the index of time,
y[n] being the received signal,
x[n] being the equalized signal,
$B_m[n]$ being the mth basis function of the basis expansion model,
M being the model order of the basis expansion model,
$b_{lm}$, being the BEM coefficient of the mth basis function of the lth channel tap, and
w[n] being optional noise.

In particular, the step of approximately solving said relation is preferably performed by approximately solving the matrix representation $$y = \left( \sum_{m=0}^{M-1} P_m C_m \right) x + w$$

of said relation by an iterative method,
$P_m$ being a diagonal matrix containing basis function $B_m[n]$,
$C_m$ being a circulant matrix containing the mth BEM coefficients $b_{lm}$ of all channel taps, and
w being optional noise.

Preferably, the step of approximately solving said matrix representation is performed by utilizing a diagonal matrix $D_m$ derived from the circulant matrix $C_m$ according to the definition $$C_m = F^H D_m F,$$

F being the matrix of the Discrete Fourier Transform and $F^H$ the conjugate transpose thereof.

Further preferred embodiments of the invention comprise one of more of the following features:

the diagonal matrix $D_m$ is computed directly from a Discrete Fourier Transform of the mth BEM coefficients of all channel taps, zero-padded up to the signal length;

the Inverse $C_0^{-1}$ of the first circulant matrix for the zero order BEM coefficients is used as a preconditioner in the iterative method;

said iterative method is the GMRES algorithm;

said iterative method is the LSQR algorithm;

the basis functions of the basis expansion model are complex exponentials;

the basis functions of the basis expansion model are Legendre polynomials;

the transmission format on the channel is OFDM;

the method is used in a decision feedback equalizer or a turbo equalizer an example of which is stated in [6].

In this way, the invention develops a novel low-complexity equalization method for doubly selective wireless channels based on the product-convolution (PC) decomposition is proposed. The method of the invention is a major improvement over its nearest competitor—fast equalization of a channel matrix banded in the frequency domain.

Current low-complexity equalizers for doubly-selective channels use an approximation of the channel by a banded matrix in the frequency domain, which is equivalent to the BEM with complex exponentials (CE-BEM), see Appendix C. However, the CE-BEM provides a poor approximation to the channel matrix [10, 14], so this approach sacrifices accuracy of channel estimation for the sake of low complexity. By contrast, the proposed equalizer has low complexity, and can be used with an arbitrary basis. In conclusion, a PC representation using a well-chosen basis leads to significant improvements in the BER after equalization, as is demonstrated in Section 5.

The algorithm uses only estimated BEM coefficients of the channel and the receive signal. The BEM coefficients can be estimated according to any known method or preferably according to a novel method disclosed by the same inventors in a copending patent application [5]. The time-domain channel matrix is represented as a sum of product-convolution operators without ever constructing the channel matrix itself. The product operators are diagonal matrices with the basis functions as diagonals. The corresponding BEM coefficients are used as filters in the convolution operators. This particular structure of the channel matrix permits a fast application of the matrix and its conjugate transpose. Therefore the PC representation combined with classical iterative methods like GMRES [25] and LSQR [26], gives rise to a low-complexity equalizer. Additionally, convergence of both GMRES and LSQR is accelerated by preconditioning with the single-tap equalizer.

The main advantages of the invention can be summarized as follows:

A low-complexity equalization method for doubly selective wireless channels is introduced. It combines the product-convolution representation with appropriate iterative algorithms for linear systems, and achieves BERs comparable with those of MMSE equalization.

The standard iterative methods GMRES and LSQR are proposed for stable regularized equalization without creating the full channel matrix. In an OFDM system with K subcarriers, each iteration requires $O(K \log K)$ flops and $O(K)$ memory.

The single-tap equalizer is proposed as an efficient preconditioner for both GMRES and LSQR.

Since the number of discrete multipaths is proportional to the bandwidth, broadband transmissions suffer from a large number of multipaths. For example, mobile WiMAX (IEEE 802.16e) with K subcarriers typically exhibits a discrete path delay of $IC/4$, $K/8$, see [27]. In such regimes, reducing the complexity and memory requirements by a factor close to K has significant practical benefits. An explicit reconstruction of the channel matrix requires $O(K^2)$ memory and $O(K^2)$ flops, which is prohibitive in several practical applications.

GMRES [25] LSQR [26] are well-known iterative methods for the numerical solution of a system of linear equations, see Appendix A for detailed descriptions. LSQR has excellent regularization properties, and achieves BERs comparable to those of MMSE equalization, see [28], [24], and Section V.

In this following only basic, deterministic versions of the algorithms are described although it is clear that further modifications using statistical information, a turbo loop (see e.g. [6]) or decision feedback can be combined with this equalizer. For the sake of clarity of presentation, the methods are described in their simplest form, without relying on any specific probabilistic assumptions. In this approach, no approximation of the channel matrix by a matrix banded in the frequency domain is ever used.

The equalization method of the invention applies to any communication systems as long as:

the wireless channel is modeled by a basis expansion, the transmit symbols are sufficiently separated to avoid intersymbol interference (ISI), which is typically achieved by using a cyclic-prefix (CP).

The inventive method applies to, for example, cyclic-prefix based orthogonal frequencydivision multiplexing (CP-OFDM) and single-carrier frequency-division multiplexing (SC-FDM). The method of the invention is quite practical, and may be readily implemented in hardware.

The method is validated by numerical simulations of a WiMAX-like system in channels with severe Doppler shifts, but the method applies to any communication systems, as long as the wireless channel is modeled by a basis expansion. Using BEM coefficients, the proposed equalizer noticeably outperforms current low-complexity equalizers, which are based on an approximation by a banded matrix in the frequency domain.

SHORT DESCRIPTION OF THE DRAWINGS

The invention will now be described in detail under reference to the enclosed drawings in which.

DETAILED DESCRIPTION OF THE INVENTION

Figure 1:
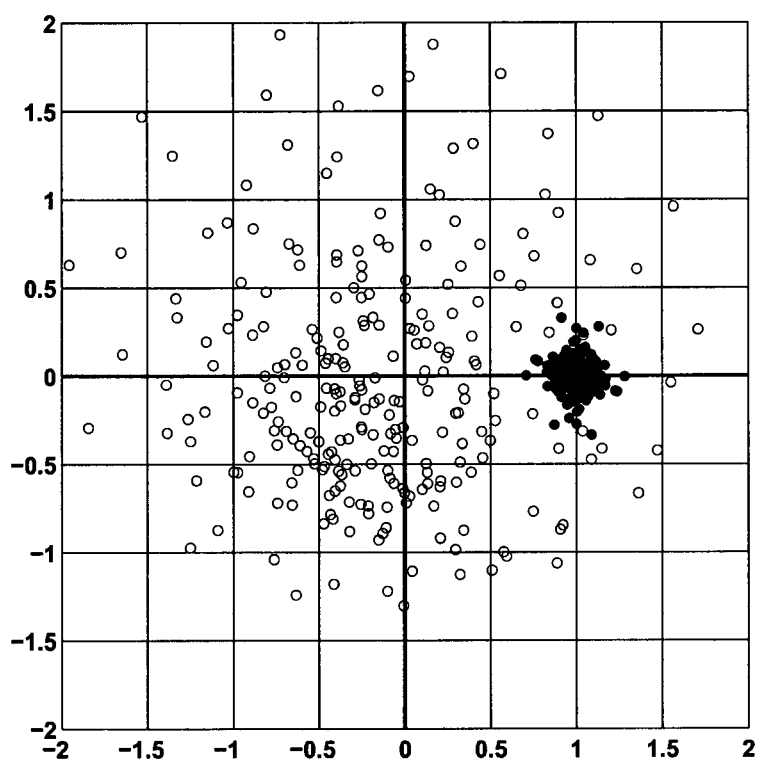
FIG. 1 shows the eigenvalues of the time-domain channel matrix with a Doppler shift equal to 17% of the inter carrier frequency spacing without preconditioning 'o', and with preconditioning '•'.

1 System Model
1.1 Transmission Model

The equalization method applies to any wireless transmission scheme as long as transmit symbols are sufficiently separated to avoid ISI, which is typically achieved by using a cyclic prefix (CP). CP-OFDM, SC-FDM are example transmission schemes with which this equalization method can be used. The equalization method is illustrated with a CP-OFDM system operating in doubly selective channels. An equivalent baseband representation of a single-antenna OFDM system with K subcarriers is considered. However, the method can be adapted to a MIMO setup in a straightforward manner. A sampling period of $T_s=1/B$ is used, where B denotes the transmit bandwidth. A cyclic prefix of length $L_{cp}$ is used in every OFDM symbol. $L_{cp}$ is chosen so large, that $L_{cp}T_s$ exceeds the channel's maximum delay, so that inter-symbol interference (ISI) is avoided. Consequently, throughout this paper only one OFDM symbol is considered at a time, and all further models and formulations refer to one OFDM symbol.

Each subcarrier is used to transmit a symbol A[k] (k=0, ..., K−1) from a finite symbol constellation (e.g. 4QAM, PSK, 64QAM). Depending on the transmission setup, some of these symbols serve as pilots for channel estimation. The OFDM modulator uses the Inverse Discrete Fourier Transform (IDFT) to map the frequency-domain transmit symbols A[k] into the time-domain transmit signal x[n]

$$x[n] = \frac{1}{\sqrt{K}} \sum_{k=0}^{K-1} A[k] e^{j2\pi \frac{nk}{K}}, n = -L_{cp}, \ldots, K-1. \quad (1)$$

After discarding the cyclic prefix at the receiver, the receive signal equals $$y[n] = \sum_{l=0}^{L-1} h_l[n] x[n-l] + w[n], n = 0, \ldots, K-1. \quad (2)$$

Here, w[n] denotes complex additive noise (AWGN) of variance $N_0$, $h_l[n]$ is the complex channel tap associated with delay l, and L is the channel length (maximum discrete-time delay). Consequently, the channel's maximum delay equals $(L-1)T_s$. For simplicity, the worst-case assumption that $L=L_{cp}$ is made. In order to simplify notation, throughout this paper the signals are assumed to be periodically extended with period K. Therefore equation (2) represents the cyclic convolution of length K. No acyclic convolutions are used in this paper.

The proposed equalization method applies to any transmission scheme, as long as the time-domain transmit-receive relation can be modeled as equation (2). This is, for example, the case with single-carrier FDM (SC-FDM). Equivalently, the transmit-receive relation (2) can be written as $$y = Hx + w, \quad (3)$$

where $y \equiv (y[0], \ldots, y[K-1])^T$ is the time-domain receive signal,
$x \equiv (x[0], \ldots, x[K-1])^T$ is the time-domain transmit signal,
$w \equiv (w[0], \ldots, w[K-1])^T$ is an additive noise process in the time domain, and H is the time-domain channel matrix.

The OFDM demodulator at the receiver's end performs the following tasks with the sampled time-domain receive signal: channel estimation, equalization, demodulation by means of the DFT, quantization, decoding and deinterleaving. In this paper, it is assumed that a channel estimate in terms of the BEM coefficients is already provided. In the next section, methods for equalization of the receive signal using the estimated BEM coefficients are developed.

1.2 Wireless Channel Representation with BEM

A basis expansion model (BEM) is considered for the channel taps. With the BEM, each channel tap $h_l$ is modeled as a linear combination of suitable basis functions. Several bases are proposed in literature, including complex exponentials [29, 30, 7, 8], complex exponentials oversampled in the frequency domain [9], discrete prolate spheroidal functions [10], polynomials [11], and the Legendre polynomials [5].

With a specific set of basis functions, the channel tap $h_l$ represented as follows $$h_l[n] = \sum_{m=0}^{M-1} b_{lm} B_m[n], l = 0, \ldots, L-1, \quad (4)$$

where $b_{lm}$, is the mth basis coefficient of the lth channel tap, $B_m$ is the mth basis function, and M is the BEM model order. Relation (4) is correct up to a modeling error, which can be reduced by increasing the model order M. On the other hand, in pilot-based estimation methods increasing M decreases the transmission capacity.

Combining (2) and (4), the time-domain receive signal y is expressed as $$y[n] = \sum_{l=0}^{L-1} \left( \sum_{m=0}^{M-1} b_{lm} B_m[n] \right) x[n-l] + w[n], \quad (5)$$

where n=0, ..., K−1, and w is an additive error, which consists of random noise and a systematic modeling error.

1.3 Equivalence of BEM and Product-Convolution Representation

Changing the order of summation in equation (5), it is obtained $$y[n] = \sum_{m=0}^{M-1} \underbrace{B_m[n]}_{product} \underbrace{\left( \sum_{l=0}^{L-1} b_{lm} x[n-l] \right)}_{cyclic-convolution} + w[n]. \quad (6)$$

$$\underbrace{\phantom{XXXXXXXXXXXXXXXXXXXXXXX}}_{sum\ of\ product-convolutions}$$

Equivalently, the time-domain channel matrix H can be expressed as a sum of product-convolutions as follows:

$$H = \sum_{m=0}^{M-1} P_m C_m, \quad (7)$$

where $P_m$ is a diagonal matrix with $P_m(i, i)$ equal to $B_m(i)$, and $C_m$ is a circulant matrix representing the cyclic convolution with the mth set of the BEM coefficients $\{b_{lm}\}_{l=0}^{M-1}$.

2 Equalization

2.1 Iterative Equalization Methods

It is well-known, that the conventional single-tap equalization in the frequency domain is inaccurate for doubly selective channels with severe ICI see [15, 16, 17]. Direct methods, like MMSE equalization, have high computational complexity and memory usage. Low-complexity methods that rely on approximation by a banded matrix in the frequency domain, are equivalent to using the CE-BEM (see Appendix C), and correct only relatively modest ICI.

TABLE 1

Characteristics of Krylov subspace methods GMRES and LSQR applied to the time-domain channel matrix H, and the time-domain receive signal y, with i iterations.

| Methods | GMRES | LSQR |
|---|---|---|
| Krylov subspace | $\mathcal{K}$(H, y, i) | $\mathcal{K}$($H^H$H, $H^H$y, i) |
| Storage | i + 1 vectors | 4 vectors |
| Work per iteration | One application of H and other linear operations. | One application of H, one application of $H^H$, and linear operations on vectors. |

In their stead, equalization with two standard iterative methods for the approximate solution of linear systems, namely GMRES [25] and LSQR [26], is proposed. The iterative nature of the method is strictly limited to the algorithms used as linear solvers, see Appendix A for their detailed descriptions. In particular, feed-back loops with partially equalized signal symbols are not used. GMRES and LSQR are both Krylov subspace methods, i.e. each approximate solution is sought within an increasing family of Krylov subspaces. Specifically, at the ith iteration GMRES constructs an approximation within the subspace $$\mathcal{K}(H,y,i) = \mathrm{Span}\{y, Hy, H^2y, \ldots, H^{(i-1)}y\}, \quad (8)$$

whereas LSQR within the subspace $$\mathcal{K}(H^HH, H^Hy, i) = \mathrm{Span}\{H^Hy, (H^HH)H^Hy, \ldots, (H^HH)^{(i-1)}H^Hy\} \quad (9)$$

For a comparison of GMRES and LSQR, see Table 2.1. Both methods use the number of iterations as a regularization parameter.

At each iteration, GMRES and LSQR require the computation of matrix-vector products of the form Hv, together with vector additions, scalar multiplications, and finding the 2-norms of vectors. Additionally, LSQR needs matrix-vector products of the form $H^Hv$. Since the most expensive part is the computation of the matrix-vector products, the complexity of one iteration of LSQR is approximately twice that of one iteration of GMRES. In Appendix A, detailed descriptions of both GMRES and LSQR are provided. With the product-convolution structure of the channel matrix H, computational complexity is reduced dramatically, see Section IV and Table II.

2.2 Regularizing Properties of LSQR

In exact arithmetic, the LSQR algorithm is equivalent to the conjugate gradient method applied to the normal equations [26]. Consequently, within K iterations LSQR computes an exact solution of a K×K system, which amounts to Zero Forcing. In practice, the inputs of LSQR are known only approximately, and using all K iterations visibly amplifies the modeling errors and noise. However, LSQR has a built-in regularization mechanism, with the number of iterations as a regularization parameter. Consequently, an early termination of iterations effectively prevents the amplification of errors and noise. The error obtained using LSQR with the optimal number of iterations is comparable to that of MMSE equalization with the optimal Tikhonov regularization parameter. An excellent survey of regularization methods is given in [28]. A detailed treatment of regularization with LSQR is given in [31, Sec. 7.6]. Combining these two references, one can conclude that LSQR achieves the minimum error possible for a certain class of regularization methods. Numerical results also confirm that equalization with LSQR is equivalent to MMSE equalization.

Another regularization method consists of applying LSQR to the matrix $[H^T \sigma I]^T$ and the vector [y0] in order to solve the following least square problem:

$$\tilde{x} = \mathrm{argmax}_x \{\|Hx - y\|_2^2 + \sigma^2 \|x\|_2^2\}, \quad (10)$$

$$= \mathrm{argmax}_x \{\|\underline{H}x - \underline{y}\|_2^2\}, \quad (11)$$

This approach is commonly known as damped LSQR, see Appendix A. The choice of the parameter σ depends on ambient noise and the modeling error. Damped LSQR combines LSQR with the Tikhonov regularization, and it has two regularization parameters: the number of iterations and the (continuous) damping parameter. Numerical simulations show of that the minimum achievable BERs are similar for LSQR and damped LSQR, even if the noise parameters are known exactly at the receiver. However, a major advantage of damped LSQR is that semi-convergence is much milder, that is the BER as a function of the number of iterations grows very slowly after reaching its minimum.

The optimal number of LSQR iterations depends directly on the noise level, and the distribution of the singular values of the channel matrix, which in turn depends on the maximum Doppler spread and the maximum delay spread. However, it has been observed experimentally, that the number of iterations does not essentially depend on the number of OFDM subcarriers K.

2.3 Preconditioning

Preconditioners accelerate convergence of iterative solvers by replacing a given matrix with one that has closely clustered eigenvalues, see [32, Section 10.3]. An approximate inverse of the matrix is commonly used as a preconditioner, since the eigenvalues of the preconditioned matrix are clustered around the point z=1 in the complex plane. The first term of the product-convolution representation (7) equal to $P_0C_0$ may be regarded as a crude approximation to the channel matrix H. Consequently, $(P_0C_0)^{-1}$ is a suitable choice for a preconditioner. If, additionally, $P_0$ is the identity matrix, $C_0^{-1}$ is used as a preconditioner, which in fact corresponds to the single-tap equalizer in the frequency domain, see equation (20). This is the case, for example, with the Legendre polynomial basis, or a complex exponential basis. The matrix $C_0^{-1}$ is the exact inverse of the channel matrix for a purely frequency selective channel, and serves as an approximate inverse for a doubly selective channel matrix with a moderate Doppler shift. However, for channels with large Doppler shifts, $C_0^{-1}$ is not a useful preconditioner.

In order to describe the preconditioner, a new variable $$\tilde{x} = C_0 x, \quad (12)$$

is introduced, and substituted it into equation (3) in the following manner $$y = Hx + w \quad (13)$$
$$= HC_0^{-1} C_0 x + w \quad (14)$$
$$= HC_0^{-1} \tilde{x} + w \quad (15)$$
$$= \tilde{H}\tilde{x} + w, \quad (16)$$

where $\tilde{H} = HC_0^{-1}$.

In view of equation (7), it follows that $$\tilde{H} = HC_0^{-1} \quad (17)$$
$$= \sum_{m=0}^{M-1} P_m C_m C_0^{-1} \quad (18)$$
$$= \sum_{m=0}^{M-1} P_m \tilde{C}_m, \quad (19)$$

where $\tilde{C}_m = C_m C_0^{-1}$ for m=0, 1, ... M−1. Clearly, the transformed time-domain channel matrix $\tilde{H}$ is also a sum of product-convolutions, so both matrices $\tilde{H}$ and $\tilde{H}^H$ can be applied at a cost $\mathcal{O}(K \log K)$. Algebraically, replacing equation (3) by equation (16) is classified as right preconditioning. For some bases, e.g. that of discrete prolates, $P_0$ is not a constant. In such cases, one should use both left and right preconditioning, see Appendix B for details.

The eigenvalues of a representative time-domain channel matrix H, and its preconditioned version $\tilde{H} = HC_0^{-1}$, are shown in FIG. 1. The eigenvalues of the preconditioned matrix $\tilde{H}$ are clustered near the point z=1 in the complex plane. It has been observed experimentally, that preconditioning with the single-tap equalizer is not effective for channels whose Doppler shift exceeds 25% of the intercarrier frequency spacing. Such channels are far away from being frequency selective, and the single-tap equalizer is not a reliable approximate inverse.

3 Description of the Algorithm 3.1 Decomposition of Channel Matrix

The proposed equalization uses only the BEM coefficients of the channel taps and the time-domain receive signal. It is assumed that estimates of the BEM coefficients are known, for example they are provided by one of the estimation methods mentioned in the introduction. In this subsection, algebraic formulas for the algorithms presented in the next subsection are derived.

It is well-known, for example see [32] (p. 202), that conjugating a circulant matrix by the Discrete Fourier Transform (DFT) results in a diagonal matrix. The cyclic convolution matrices $C_m$ are thus expressed as $$C_m = F^H b_m F, \quad m=0, \ldots, M-1, \quad (20)$$

where $D_m$ are diagonal matrices, and F is the matrix of the DFT in K dimensions. The diagonal of the matrix $D_m$ coincides with the DFT of the BEM coefficients $b_{\cdot,m}$ zero-padded to length K, $$D_m(i,i) = (F[b_{\cdot,m}, 0, \ldots, 0]^T)(i), \quad (21)$$

for i=1, ..., K, $(\cdot)^T$ denotes the transpose operation.

Substituting relation (20) into equation (18), it is obtained $$\tilde{H} = \sum_{m=0}^{M-1} P_m F^H D_m F F^H D_0^{-1} F \quad (22)$$
$$= \sum_{m=0}^{M-1} P_m F^H \tilde{D}_m F, \quad (23)$$

where $$\tilde{D}_m = D_m D_0^{-1} \quad (24)$$

is a diagonal matrix. Similarly, substituting relation (20) into equation (12), it is obtained $$\tilde{x} = C_0 x = F^H D_0 F x. \quad (25)$$

Combining equations (23) and (16), the time-domain receive signal y is expressed in the following form $$y = \left( \sum_{m=0}^{M-1} P_m F^H \tilde{D}_m F \right) \tilde{x} + w. \quad (26)$$

In the frequency domain, equation (26) has the form $$Y = Fy \quad (27)$$
$$= F \left( \sum_{m=0}^{M-1} P_m F^H \tilde{D}_m F \right) \tilde{x} + W, \quad (28)$$
$$= F \left( \sum_{m=0}^{M-1} P_m F^H \tilde{D}_m \right) F F^H D_0 F x + W, \quad (29)$$
$$= \underbrace{F \left( \sum_{m=0}^{M-1} P_m F^H \tilde{D}_m \right)}_{ICI} \underbrace{D_0}_{FS} A + W, \quad (30)$$

where W is the noise in the frequency domain, $$A = Fx = D_0^{-1} F \tilde{x} \quad (31)$$

is the frequency-domain transmit signal as used in equation (1), and Y is the receive signal in the frequency domain. Equation (30) demonstrates that doubly selective frequency-domain channel matrix is the product of a frequency selective (FS) operator $D_0$, and an operator accounting for ICI.

3.2 Algorithm

The proposed equalization algorithm in the time domain is based on equation (23), and can be summarized as follows: given the time-domain receive signal y and the BEM coefficients $b_{l,m}$, $\tilde{x}$ is computed using iterative solvers GMRES or LSQR, and then A is approximated with $D_0^{-1} F \tilde{x}$. Specifically, the following steps are executed:

Step 0: Compute the diagonal matrices $D_m$ from the BEM coefficients $b_{l,m}$, see equation (21).

Step 1: Compute the diagonal matrices $\tilde{D}_m = D_m D_0^{-1}$, see equation (24).

Step 2: Solve (26) for $\tilde{x}$ using GMRES or LSQR.

Step 3: Approximate A as $D_0^{-1} F \tilde{x}$, see equation (31).

Step 4: Quantize according to the alphabet used (4QAM, PSK etc.).

Step 2 is only used if preconditioning is required, otherwise $\tilde{D}_m$ equals to $D_m$.

A similar algorithm for equalization in the frequency domain can be formulated using equation (30), with the frequency-domain channel matrix expressed as a sum of convolution-products. Equalization in the time and in the frequency domain gives identical errors, because the errors are related by a unitary operator.

Other iterative methods for the solution of linear systems can also be used in place of LSQR, and GMRES.

3.3 Computational Complexity

Operation counts of equalization of one OFDM symbol are reported. The diagonal matrices $P_m$ are assumed to be precomputed. The computation of diagonal matrices $D_m$ from the BEM coefficients in Step 1 requires $\mathcal{O}$ (MK log K) operations. Whenever preconditioning is used, Step 2 is executed (creation of the diagonal matrices $\tilde{D}_m$), and it requires $\mathcal{O}$ (MK) operations. In Step 3, $\tilde{x}$ is approximated using iterative methods GMRES or LSQR; this requires $\mathcal{O}$ (K log K) operations per iteration. A typical number of iterations does not

TABLE 2

The complex flop count for the proposed algorithm per OFDM symbol with i iterations of GMRES, LSQR or damped LSQR.

| step | description | complex flop count |
|---|---|---|
| 1 | computing $D_m$ from the BEM coefficients $b_{lm}$ | MK logK |
| 2 | computing $\tilde{D}_m$ from $D_m$ | (M − 1)K |
| 3 | solving $\tilde{x}$ iteratively using: | |
| | a. GMRES | (i + 1)MK logK + ($i^2$ + 3i + Mi + M)K + $5i^2$ + 12i + 7 |
| | b. LSQR | (2i + 1)MK log K + (10i + 3 + 2Mi + 2M)K + 14i + 1 |
| | c. damped LSQR | (2i + 1)MK log K + (12i + 3 + 2Mi + 2M)K + 14i + 1 |
| 4 | equalizing A as $D_0^{-1}F\tilde{x}$ | K logK + K |
| 5 | quantizing to symbol constellation | K | exceed 16. In Step 4, the frequency-domain transmit signal A is computed from $\tilde{x}$ using equation (31), which requires $\mathcal{O}$ (K log K) operations. In Step 5, the signal A is quantized according to the alphabet used at the cost of $\mathcal{O}$ (K) operations. A detailed breakdown of computational complexity is provided in Table II.

3.4 Memory

The equalization process begins with the time-domain receive signal y and the BEM coefficients $b_{lm}$, which are stored as K and ML floating point complex numbers, respectively. $P_m$ and $\tilde{D}_m$ are diagonal matrices, which are stored as K complex numbers each. The matrix-vector multiplications required by GAMES and LSQR are done using pointwise multiplications and the FFT-s of size K, see equation (23). After the ith iteration, GMRES requires storing i+1 vectors of length K, while LSQR requires storing four vectors of length K. Thus the proposed algorithm requires $\mathcal{O}$ (K) memory.

3.5 Comparison with Other Low-Complexity Equalizers

Current equalizers achieve a reduced complexity by means of approximation by a banded matrix in the frequency domain [22], [6], [33]. Generally, such methods also require preprocessing with a time domain window, which increases ICI of the neighboring subcarriers, and reduces ICI of distant ones. A banded approximation of the frequency domain channel matrix is equivalent to the complex exponential BEM (CE-BEM), see Appendix C. However, the CE-BEM is known to be inaccurate for doubly selective wireless channels, see [14], [2].

For example, in [6] the channel matrix is initially estimated using the DPS-BEM. This approximation is later replaced by one banded in the frequency domain, which amounts to a transition to the CE-BEM. Thus the original information about the channel is lost before equalization. On the other hand, the proposed equalizer can be used with all bases, and retains the full information obtained during channel estimation.

Setting aside the computational complexity, the most accurate equalization is obtained using the entire channel matrix. This is prominent in the results obtained in [22] by using the Matched Filter Bound (MFB) equalization, and in [33] by using the nonbanded Block Linear Equalizer (BLE). However, the equalization results with the full channel matrix in [6] are not significantly better than those of equalization with a banded approximation. This is because preprocessing with a window in the time domain is done before equalization, see Section VI in [6]. It has been observed experimentally that such preprocessing increases the condition number of the whole channel matrix by orders of magnitude, and degrades the BER after equalization with the entire channel matrix. By contrast, no window is used in either [22] or [33]. Low-complexity equalizers in [22], [33], [6], use a banded approximation of the frequency domain channel matrix. On the other hand, the proposed algorithm achieves a low complexity by means of a representation of the channel matrix as a sum of product-convolution operators, which is inherent in any BEM. Thus we use sparsity of the channel matrix in a different way than a banded approximation of the channel matrix in frequency domain. It is observed in [24] that for equalization with LSQR is as accurate as one with MMSE. This observation is confirmed experimentally in Section V. In exact arithmetic, LSQR is equivalent to conjugate gradient on normal equations (CGNE) [26]. Consequently, the proposed method obtains accuracy similar to MMSE equalization with a low complexity.

The computation of the optimal windows, as suggested in [22], [33], requires the second order channel statistics, which are not easy to obtain. In this paper we discuss methods which do not require any statistical information. Thus, when comparing the proposed equalization method with banded equalizers, a linear preprocessing with a fixed window is performed before applying the banded equalizer. Specifically, the Blackman window is used, which is close to the window proposed in [33]. FIGS. 7(a) and 7(b) compare the BERs of the proposed method, and equalization using a banded frequency-domain channel matrix which is preprocessed with the Blackman window. The latter equalization with bandwidth D requires $\mathcal{O}$ ($D^2$K) operations. The proposed equalizer does not use any windowing. Using a time domain window on the receiver's side is equivalent to using a BEM with a modified basis, namely one obtained by multiplying the original basis by the window.

4 Computer Simulations

4.1 Simulation Setup

The transmission setup conforms to the IEEE 802.16e specifications. A coded OFDM system with K=256 subcarriers, utilizing B=2.8 MHz of bandwidth at a carrier frequency of $f_c$=5.8 GHz is simulated. A cyclic prefix of length $L_{cp}$=32 is used in order to avoid ISI. Consequently, the sampling period is $T_s$=1/B=0.357 μs, and the symbol duration is $(K+L_{cp})T_s$=(256+32)×0.357 μs=102.9 μs. The information bits are encoded using a convolutional code of rate ½, passed through an interleaver, and mapped to 4-QAM symbols. For experiments with estimated BEM coefficients, a frequency-domain Kronecker delta (FDKD) pilot arrangement is deployed in each OFDM symbol, as described in [12], [5]. The pilots are only used for estimation of the BEM coefficients, and do not have any influence on the proposed equalization algorithm. Experiments with exact channel state information (CSI) do not use pilots in transmission.

A wide sense stationary uncorrelated scattering (WSSUS) Rayleigh fading channel is simulated with a maximum delay of 11.4 µs, which corresponds to the worst case when $L=L_{cp}=32$ taps. Each tap has an average path gain of −2 dB and a Jakes Doppler spectrum. The simulated transmit signal is filtered through channels with varying maximum Doppler shifts. The maximum Doppler shift $v_{max}$ is related to the receiver velocity υ by the formula $$v_{max} = \frac{v}{c} f_c, \quad (32)$$

where c is the speed of light. To the signal filtered through the channel, additive white Gaussian noise (AWGN) of varying energy per bit to noise spectral density ($E_b/N_0$) is added. The values of $v_{max}$, υ, $E_b/N_0$ are reported for all the experiments. The channel is simulated using the MATLAB Communication Toolbox (version 4.2).

At the receiver, first the BEM coefficients are computed. Specifically, in numerical experiments the basis of the Legendre polynomials [5] is used. In experiments with estimated channel taps, the algorithm described in [5] is used for estimation of the BEM coefficients. In experiments with the exact channel matrix, the BEM coefficients are computed by projecting the channel taps on the basis functions. Subsequently, the receive signal is equalized using the proposed algorithm. Finally, the equalized signal is quantized and decoded using the BCJR algorithm and deinterleaved. As a measure of performance, we report the bit error rate (BER) averaged over 100,000 OFDM symbols.

4.2 Discussion of Results

Figure 2:
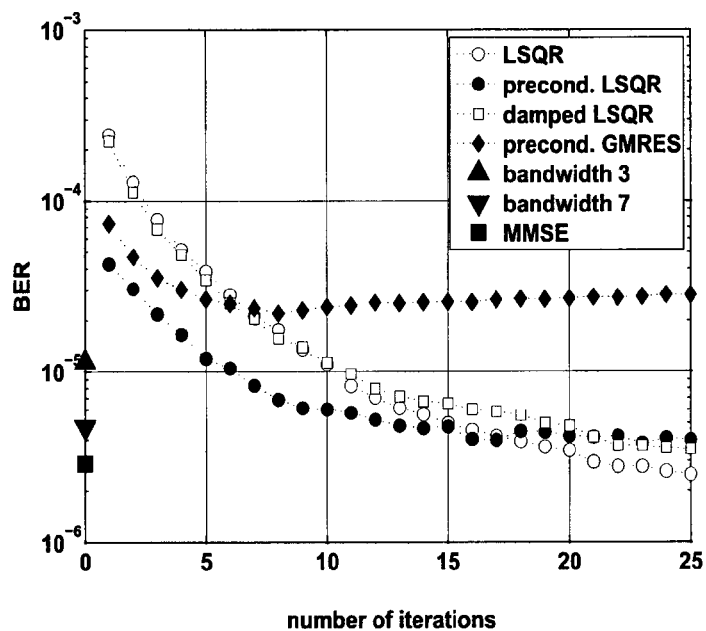
FIG. 2 shows the BER as a function of the number of iterations at the receiver velocity of 175 km/h and the SNR of Eb/N0=20 dB using exact CSI.
Figure 3:
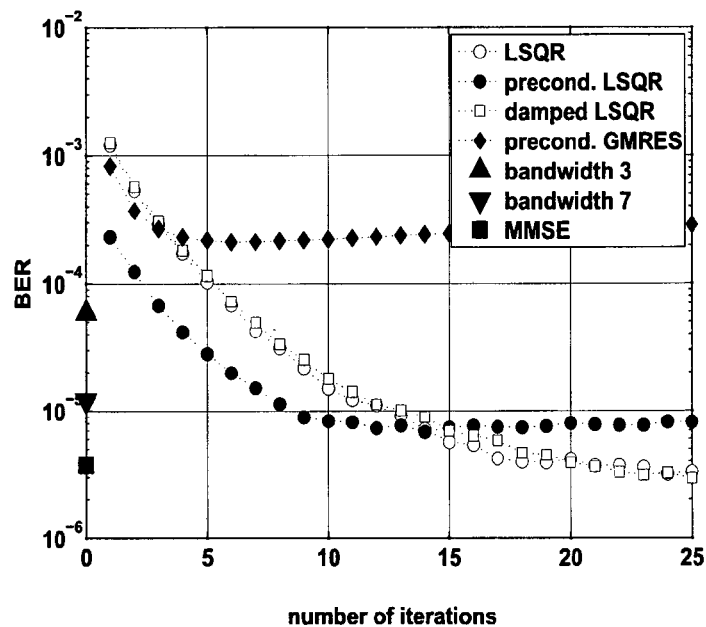
FIG. 3 shows the BER as a function of the number of iterations at the receiver velocity of 300 km/h and the SNR of Eb/N0=20 dB using exact CSI.
Figure 4:
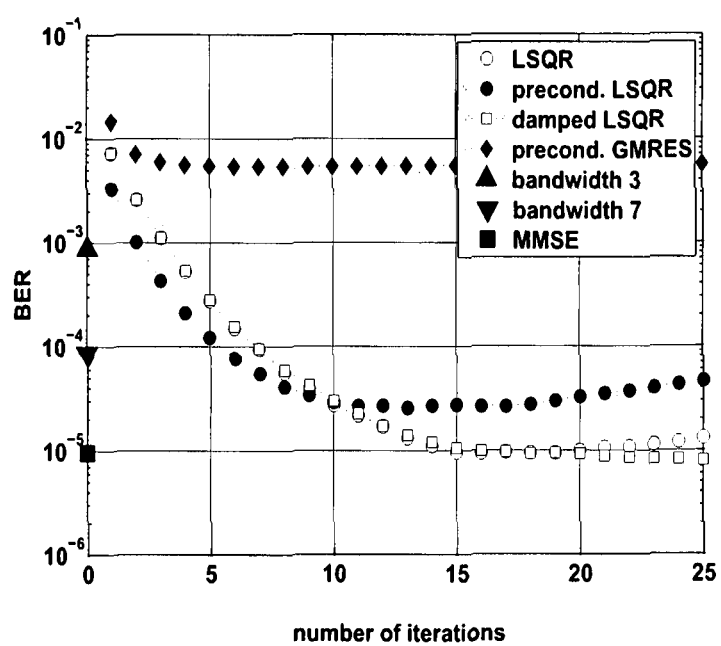
FIG. 4 shows the BER as a function of the number of iterations at the receiver velocity of 550 km/h and the SNR of Eb/N0=20 dB using exact CSI.

First, the dependence of the BER on the number of iterations of GMRES, LSQR and damped LSQR is studied, with and without preconditioning. In the case of GMRES, only the results with preconditioning are presented, since without preconditioning GMRES needs approximately K iterations to achieve a useful BER. One iteration of LSQR requires approximately twice as many flops as that of GMRES, see Table II for details. FIGS. 2, 3, and 4 show the BER as a function of the number of iterations at receiver velocities of 175 km/h, 300 km/h and 550 km/h, respectively. Receiver velocities of 175 km/h, 300 km/h and 550 km/h correspond to reflector velocities of 87.5 km/h, 150 km/h and 275 km/h, respectively, and are ubiquitous in the modern environment. Additive noise in the channel is simulated for a fixed SNR of $E_b/N_0$=20 dB. The exact CSI is used in all these experiments. The BER at iteration number zero corresponds to single-tap equalization, and is shown for comparison.

FIG. 2 presents results for the receiver velocity of 175 km/h, which corresponds to a Doppler shift of 0.94 kHz, or about 8.6% of the subcarrier spacing. The BERs of the banded equalizer with bandwidth 3 and 7 are equal to $1.1 \cdot 10^{-5}$ and $4.8 \cdot 10^{-6}$, respectively. The BER of MMSE equalization equals $2.9 \cdot 10^{-6}$. The BER of preconditioned GMRES decreases from $7.3 \cdot 10^{-5}$ after one iteration to $2.2 \cdot 10^{-5}$ after 8 iterations. The BER of LSQR decreases from $2.4 \cdot 10^{-4}$ after one iteration to $2.5 \cdot 10^{-6}$ after 25 iterations. The BER of preconditioned LSQR decreases from $4.3 \cdot 10^{-5}$ after one iteration to $4.0 \cdot 10^{-6}$ after 16 iterations. The BER of damped LSQR decreases from $2.2 \cdot 10^{-4}$ after one iteration to $3.5 \cdot 10^{-6}$ after 25 iterations.

FIG. 3 presents results for the receiver velocity of 300 km/h, which corresponds to a Doppler shift of 1.61 kHz, or about 14.7% of the subcarrier spacing. The BERs of the banded equalizer with bandwidth 3 and 7 are equal to $5.9 \cdot 10^{-5}$ and $1.2 \cdot 10^{-5}$, respectively. The BER of MMSE equalization equals $3.7 \cdot 10^{-6}$. The BER of preconditioned GMRES decreases from $8.3 \cdot 10^{-4}$ after one iteration to $2.1 \cdot 10^{-4}$ after 6 iterations. The BER of LSQR decreases from $1.2 \cdot 10^{-3}$ after one iteration to $3.2 \cdot 10^{-6}$ after 24 iterations. The BER of preconditioned LSQR decreases from $2.3 \cdot 10^{-4}$ after one iteration to $6.8 \cdot 10^{-6}$ after 14 iterations. The BER of damped LSQR decreases from $1.3 \cdot 10^{-3}$ after one iteration to $3.0 \cdot 10^{-6}$ after 25 iterations.

FIG. 4 presents results for the receiver velocity of 550 km/h, which corresponds to a Doppler shift of 2.95 kHz, or about 27% of the subcarrier spacing. The BERs of the banded equalizer with bandwidth 3 and 7 are equal to $8.8 \cdot 10^{-4}$ and $8.6 \cdot 10^{-5}$, respectively. The BER of MMSE equalization equals $9.5 \cdot 10^{-6}$. The BER of preconditioned GMRES decreases from $1.5 \cdot 10^{-2}$ after one iteration to $5.4 \cdot 10^{-3}$ after 5 iterations. The BER of LSQR decreases from $7.3 \cdot 10^{-3}$ after one iteration to $9.4 \cdot 10^{-6}$ after 16 iterations. The BER of preconditioned LSQR decreases from $3.3 \cdot 10^{-3}$ after one iteration to $2.6 \cdot 10^{-5}$ after 13 iterations. The BER of damped LSQR decreases from $7.2 \cdot 10^{-3}$ after one iteration to $8.1 \cdot 10^{-6}$ after 25 iterations.

All iterative methods in FIGS. 2, 3, and 4 display the phenomenon known as semi-convergence. Specifically, the first few iterations provide approximations of increasing accuracy, which is confirmed by the decreasing BERs. The subsequent iterations do not further improve the solution, and sometimes even amplify ambient noise, as evidenced by the slowly increasing BERs.

Figure 5:
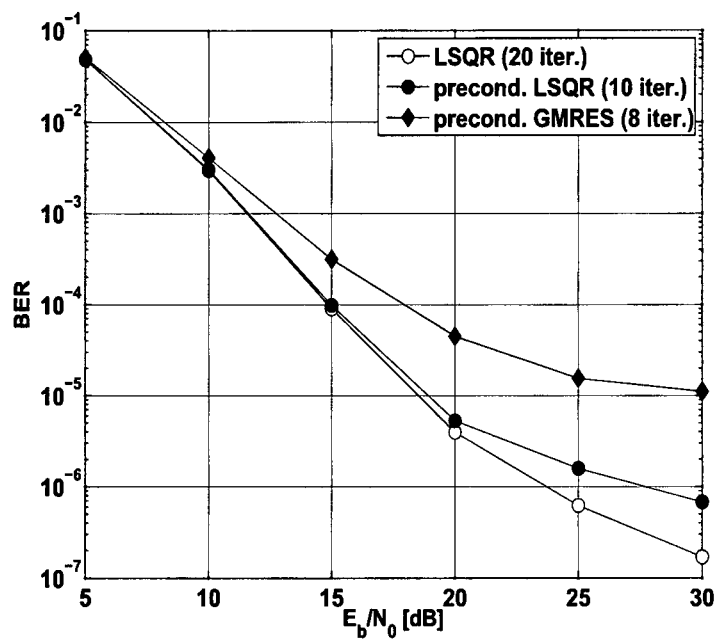
FIG. 5a shows the BER as a function of the SNR expressed as Eb/N0 at the receiver velocity of 175 km/h, using exact CSI.
FIG. 5b shows the BER as a function of the SNR expressed as Eb/N0 at the receiver velocity of 175 km/h, using estimated CSI.
Figure 5:
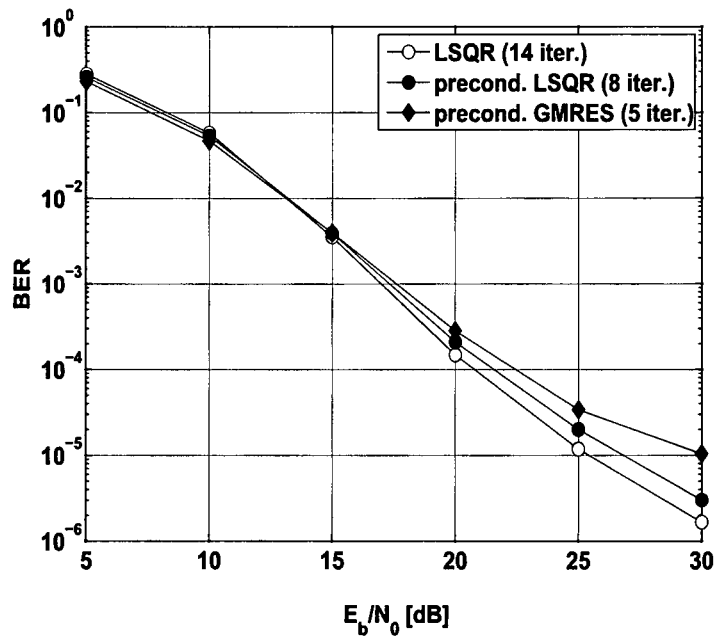
Figure 6:
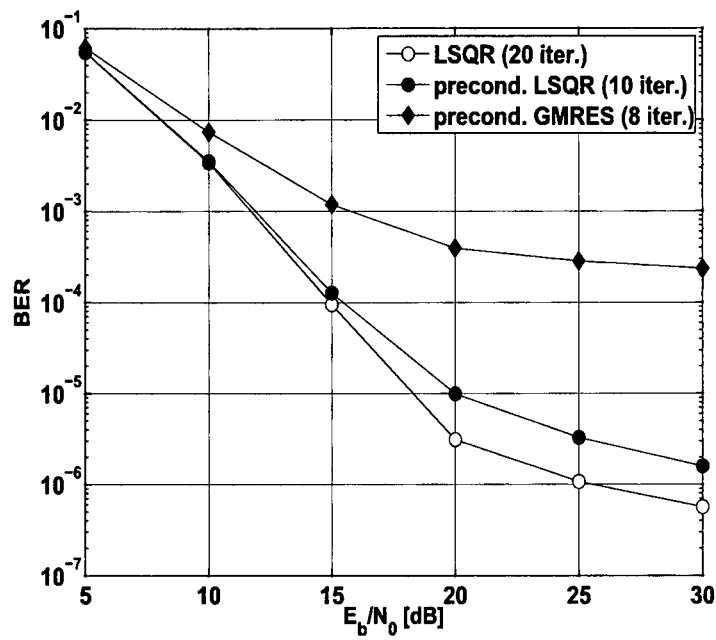
FIG. 6a shows the BER as a function of the SNR expressed as Eb/N0 at the receiver velocity of 300 km/h, using exact CSI.
FIG. 6b shows the BER as a function of the SNR expressed as Eb/N0 at the receiver velocity of 300 km/h, using estimated CSI.
Figure 6:
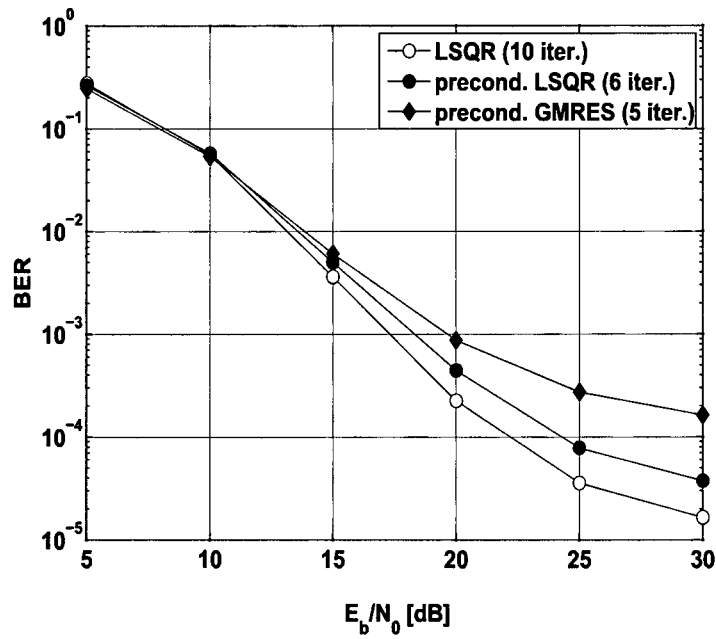
Figure 7:
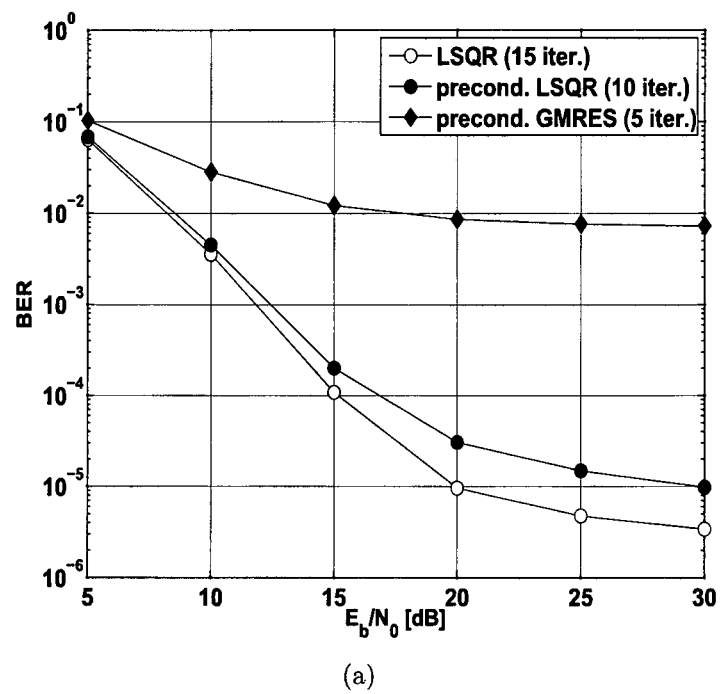
FIG. 7a shows the BER as a function of the SNR expressed as Eb/N0 at the receiver velocity of 550 km/h, using exact CSI.
FIG. 7b shows the BER as a function of the SNR expressed as Eb/N0 at the receiver velocity of 550 km/h, using estimated CSI.
Figure 7:
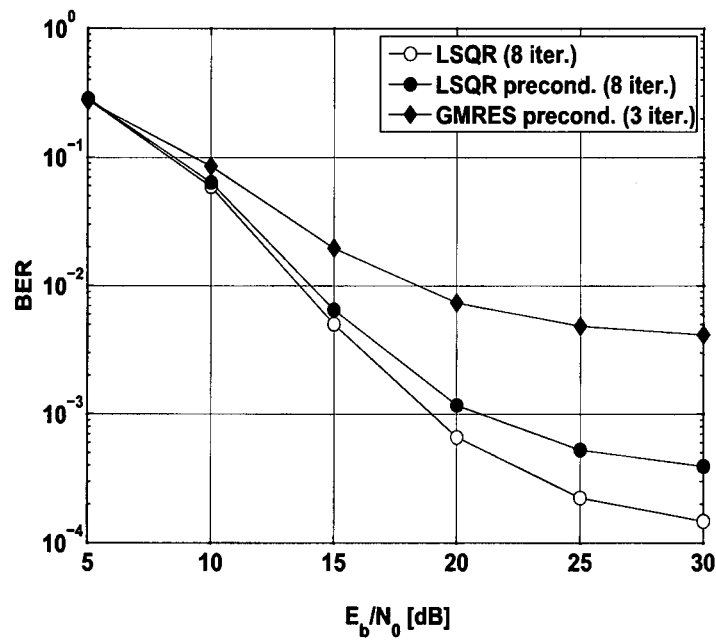

FIGS. 5, 6, and 7 show the dependence of the BER on the SNR expressed in terms of the energy per bit to noise spectral density ratio $E_b/N_0$ for channels simulated with the receiver speed of 175 km/h, 300 km/h, and 550 km/h. Numerical results for channels estimated using a pilot-aided method described in [5] are presented, together with the results obtained with the exact channel matrix as a benchmark. In all experiments, the number of iterations depends on the receiver velocity and the iterative method used, but not on the SNR. Specifically, the number of iterations is optimized for a fixed SNR of $E_b/N_0$=20 dB, as determined from FIGS. 2, 3, and 4. Further optimization of the number of iterations with respect to the SNR is not practical, since the noise level is often unknown.

FIGS. 5(a) and 5(b) show the BER with the exact and estimated CSI, respectively, corresponding to the receiver velocity of 175 km/h, or 8.6% of the subcarrier spacing. With exact CSI, 20 iterations of LSQR are used, and 10 iterations of preconditioned LSQR, and 8 iterations of preconditioned GMRES. With estimated CSI, 14 iterations of LSQR are used, and 8 iterations of preconditioned LSQR, and 5 iterations of preconditioned GMRES. The observed BERs are reported for $E_b/N_0$=15 dB, and $E_b/N_0$=25 dB, respectively, which are of high practical interest. With exact CSI, LSQR, respectively, achieves the BERs of $9.0 \cdot 10^{-5}$ and $6.3 \cdot 10^{-7}$, preconditioned LSQR achieves the BERs of $9.8 \cdot 10^{-5}$ and $1.6 \cdot 10^{-6}$, and preconditioned GMRES achieves the BERs of $3.1 \cdot 10^{-4}$ and $1.6 \cdot 10^{-5}$. With estimated CSI, LSQR, respectively, achieves the BERs of $3.5 \cdot 10^{-3}$ and $1.2 \cdot 10^{-5}$, preconditioned LSQR achieves the BERs of $3.9 \cdot 10^{-3}$ and $2.0 \cdot 10^{-5}$, and preconditioned GMRES achieves the BERs of $3.9 \cdot 10^{-3}$ and $3.4 \cdot 10^{-5}$.

FIGS. 6(a) and 6(b) show the BER with the exact and estimated CSI, respectively, corresponding to the receiver velocity of 300 km/h, or 14.7% of the subcarrier spacing. With exact CSI, 20 iterations of LSQR are used, and 10 iterations of preconditioned LSQR, and 8 iterations of preconditioned GMRES. With estimated CSI, 10 iterations of LSQR are used, and 6 iterations of preconditioned LSQR, and 5 iterations of preconditioned GMRES. The observed BERs are reported for $E_b/N_0=15$ dB, and $E_b/N_0=25$ dB, respectively. With exact CSI, LSQR, respectively, achieves the BERs of $9.5 \cdot 10^{-5}$ and $1.1 \cdot 10^{-6}$, preconditioned LSQR achieves the BERs of $1.3 \cdot 10^{-4}$ and $3.3 \cdot 10^{-6}$, and preconditioned GMRES achieves the BERs of $1.2 \cdot 10^{-3}$ and $2.8 \cdot 10^{-4}$. With estimated CSI, LSQR, respectively, achieves the BERs of $3.6 \cdot 10^{-3}$ and $3.6 \cdot 10^{-5}$, preconditioned LSQR achieves the BERs of $5.0 \cdot 10^{-3}$ and $7.8 \cdot 10^{-5}$, and preconditioned GMRES achieves the BERs of $6.0 \cdot 10^{-3}$ and $2.7 \cdot 10^{-4}$.

FIGS. 7(a) and 7(b) show the BER with the exact and estimated CSI, respectively, corresponding to the receiver velocity of 550 km/h, or 27% of the subcarrier spacing. With exact CSI, 15 iterations of LSQR are used, and 10 iterations of preconditioned LSQR, and 5 iterations of preconditioned GMRES. With estimated CSI, 14 iterations of LSQR are used, and 8 iterations of preconditioned LSQR, and 5 iterations of preconditioned GMRES. The observed BERs are reported for $E_b/N_0=15$ dB, and $E_b/N_0=25$ dB, respectively. With exact CSI, LSQR, respectively, achieves the BERs of $1.1 \cdot 10^{-4}$ and $4.8 \cdot 10^{-6}$, preconditioned LSQR achieves the BERs of $2.0 \cdot 10^{-}$ and $1.5 \cdot 10^{-5}$, and preconditioned GAMES achieves the BERs of $1.2 \cdot 10^{-2}$ and $7.7 \cdot 10^{-3}$. With estimated CSI, LSQR, respectively, achieves the BERs of $5.0 \cdot 10^{-3}$ and $2.2 \cdot 10^{-4}$, preconditioned LSQR achieves the BERs of $6.5 \cdot 10^{-3}$ and $5.3 \cdot 10^{-4}$, and preconditioned GMRES achieves the BERs of $2.0 \cdot 10^{-2}$ and $4.8 \cdot 10^{-3}$.

In numerical experiments, it is observed that convergence of GMRES is very slow, which renders the method impractical. Preconditioned GMRES converges fast when applied to doubly selective channels with moderate Doppler shifts. LSQR is very effective for doubly selective channels with moderate to large Doppler shifts. Preconditioning LSQR with the single-tap equalizer accelerates convergence by a factor of about 2 in channels with moderate Doppler spreads. However, it is not effective for channels whose Doppler shift exceeds 25% of the intercarrier frequency spacing. Such channels are far away from being purely frequency selective, and the single-tap equalizer is not reliable as an approximate inverse. The proposed method has also been used in combination with a Blackman window on the receiver's side. However, only insignificant improvements in BER have been observed. The performance of the proposed equalization method using estimated BEM coefficients demonstrates that the proposed equalization method can be applied in practice in combination with presently available BEM estimation algorithms.

5 Conclusions

A novel, low-complexity equalization method is presented, which uses the BEM coefficients of the wireless channel taps without ever creating the channel matrix. The method is aimed at doubly selective channels with moderate and high Doppler spreads. Equalization is performed with classical iterative methods for linear systems, specifically with GMRES or LSQR. The main idea is to treat the wireless channel modeled by a basis expansion as a sum of product-convolution operators. This special structure permits a fast computation of matrix-vector products. For example, in case of an OFDM system with K subcarriers, each iteration costs $\mathcal{O}(K \log K)$ operations.

Convergence of both GMRES and LSQR can be significantly accelerated by preconditioning with the single-tap equalizer. Typically, 3-16 iterations are required for convergence. The method is validated by computation simulations, which use existing pilot-aided channel estimation methods. In high Doppler regimes, LSQR-based equalization outperforms equalization based on approximation by a banded matrix in the frequency domain by a factor of 40-60 in BER.

A GMRES and LSQR

In this appendix, a detailed description of GMRES [25] and LSQR [26] is given. Both are well-known iterative methods for the numerical solution of a system of linear equations. A linear system is derived from the time-domain transmit-receive relation (3) by ignoring the noise component, $$Hx=y. \tag{33}$$

Thus matrix H is of size K×K, and x, y are vectors of length K.

GMRES

The ith Krylov subspace for this problem is $$\mathcal{K}_{(H,y,i)}=\text{span}\{y, Hy, H^2y, \ldots, H^{(i-1)}y\}. \tag{34}$$

GMRES approximates the exact solution of (33) by a vector $x_i \in \mathcal{K}(H, y, i)$ that minimizes the norm $\|r_i\|_2$ of the residual $$r_i = y - Hx_i. \tag{35}$$

The vectors $y, Hy, \ldots, H^{(i-1)}y$ are not necessarily orthogonal, so the Arnoldi iteration is used to find orthonormal basis vectors $q_1, q_2, \ldots, q_i$ for $\mathcal{K}(H, y, i)$. Subsequently, the vector $x_i \in \mathcal{K}(H, y, i)$ is written as $x_i = Q_i b_i$, where $Q_i$ is the K×i matrix formed by $q_1, \ldots, q_i$, and $b_i \in \mathbb{C}^i$.

The Arnoldi process produces an (i+1)×i upper Hessenberg matrix $\mathcal{H}_i$ which satisfies $$HQ_i = Q_{(i+1)} \mathcal{H}_i \tag{36}$$

Because $Q_i$ has orthogonal columns, it follows that $$\|y - Hx_i\|_2 = \|\mathcal{H}_i b_n - \beta e_1\|_2, \tag{37}$$

where $e_1=(1, 0, 0, \ldots, 0)$, and $\beta=\|y\|_2$. Therefore, $x_i$ can be found by minimizing the norm of the residual $$r_n = \beta e_1 - \mathcal{H}_i b_i. \tag{38}$$

This is a linear least squares problem of size i×i, which is solved using the QR factorization. One can summarize the GMRES method as follows.

At every step of the iteration:
1. Do one step of the Arnoldi method.
2. Find the $b_i$ which minimizes $\|r_i\|_2$ using the QR factorization at a cost of $\mathcal{O}(i^2)$ flops.
3. Compute $x_i = Q_i b_i$.
4. Repeat if the residual is not yet small enough.

LSQR

LSQR is an iterative algorithm for the approximate solution of the linear system (33). In exact arithmetic, LSQR is equivalent to the conjugate gradient method for the normal equations $H^H Hx = H^H y$. In the ith iteration, one constructs a vector $x_i$ in the Krylov subspace $$\mathcal{K}(H^H H, H^H y, i) = \text{Span}\{H^H y, (H^H H) H^H y, \ldots, (H^H H)^{(i-1)} H^H y\} \tag{39}$$

that minimizes the norm of the residual $\|y - Hx_i\|_2$.

LSQR consists of two steps: the Golub-Kahan bidiagonalization and the solution of a bidiagonal least squares problem. The Golub-Kahan bidiagonalization [32] constructs vectors $u_i$, $v_i$, and positive constants $\alpha_i$, $\beta_i$ (i=1, 2, ...) as follows:

1. Set $\beta_1 = \|y\|_2, u_1 = y/\beta_1, \alpha_1 = \|H^H y\|_2, v_1 = H^H y / \alpha_1$.

2. For i=1, 2, . . . , set $$\beta_{i+1} = \|Hv_i - \alpha_i u_i\|_2, \quad u_{i+1} = (Hv_i - \alpha_i u_i)/\beta_{i+1},$$

$$\alpha_{i+1} = \|H^H u_i - \beta_i v_i\|_2, \quad v_{i+1} = (H^H u_i - \beta_i v_i)/\alpha_{i+1}.$$

The process is terminated if $\alpha_{i+i}=0$ or $\beta_{i+1}=0$.

In exact arithmetic, the $u_i$'s are orthonormal, and so are the $v_i$'s. Therefore, one can reduce the approximation problem over the ith Krylov subspace to the following least square problem:

$$\min_{w_i} \|B_i w_i - [\beta_1, 0, 0, \ldots]^T\|_2, \quad (40)$$

where $B_i$ is the $(i+1) \times i$ lower bidiagonal matrix with $\alpha_1, \ldots, \alpha_i$ on the main diagonal, and $\beta_2, \ldots, \beta_{i+1}$ on the first subdiagonal. This least squares problem is solved at a negligible cost using the QR factorization of the bidiagonal matrix $B_i$. Finally, the ith approximate solution is computed as $$x_i = \sum_{j=1}^{i} w_i(j) v_j. \quad (41)$$

The second LSQR step solves the least squares problem (40) using the QR factorization of $B_i$. The computational costs of this step are negligible due to the bidiagonal structure of $B_i$. Furthermore, [26] introduced a simple recursion to compute $w_i$ and $x_i$ via a simple vector update from the approximate solution obtained in the previous iteration.

B Left Preconditioning

If a constant function is the first basis function of a BEM, then $C_0^{-1}$ is a good right preconditioner. During extensive numerical simulations, no difference in BER has been found between using $C_0^{-1}$ as a left or as a right preconditioner. However, using $C_0^{-1}$ as a left preconditioner makes the transformed time-domain channel matrix into a sum of convolution-product-convolution operators. This makes matrix-vector multiplication with system matrix preconditioned on the left by $C_0^{-1}$ more expensive than preconditioned on the right by $C_0^{-1}$. For a BEM which does not include a constant function, $P_0^{-1}$ is a suitable left preconditioner. Using the left preconditioning in the time-domain transmit-receive relation (3), it is obtained $$\tilde{y} = P_0^{-1} y = P_0^{-1} H x + P_0^{-1} \tilde{w} \quad (42)$$

$$= P_0^{-1} H x + \tilde{w}, \quad (43)$$

where $\tilde{y}$ is the transformed time-domain receive signal, and $\tilde{w}$ is the transformed noise. Writing H as a sum of product-convolution operators (7) in equation (42), it is obtained $$\tilde{y} = P_0^{-1} \left( \sum_{m=0}^{M-1} P_m C_m \right) x + \tilde{w} \quad (44)$$

$$= \left( \sum_{m=0}^{M-1} P'_m C_m \right) x + \tilde{w} \quad (45)$$

$$= \tilde{H}_L x + \tilde{w}, \quad (46)$$

where $\tilde{H}_L = P_0^{-1} H$ is the transformed time-domain channel matrix. Clearly, $\tilde{H}_L$ is also a sum of product-convolution operators, which allows a fast computation of matrix-vector products with $\tilde{H}_L$ and $\tilde{H}_L^H$.

C Representation of a Banded Matrix in the Frequency Domain as a CE-BEM

In this appendix, it is shown that approximation with a channel matrix banded in the frequency domain is equivalent to using a CE-BEM. It is well-known, that a CE-BEM gives rise to a banded channel matrix in the frequency domain, [22]. It is demonstrated that the opposite is also true. Theorem. Let H be an arbitrary K×K time-domain channel matrix with the maximum discrete delay L−1, and let B be the banded truncation of the frequency-domain channel matrix FHF$^H$ with the bandwidth 2Q+1, 0≤Q<K. The time-domain matrix E=F$^H$BF is a CE-BEM matrix with the model order 2Q+1, and with the maximum discrete delay L−1.

Proof.

The entries of the matrices H, B and E are denoted by $h_{rs}$, $b_{km}$ and $e_{pq}$, respectively. For all indices k and m, 0≤k, m≤K−1, such that |m−k|≤Q, we have $$b_{km} = \frac{1}{K} \sum_{0 \leq r, s, K} e^{-j2\pi \frac{kr}{K}} h_{rs} e^{j2\pi \frac{sm}{K}}. \quad (47)$$

Setting m=k+d, |d|≤Q, it is obtained $$b_{k,k+d} = \frac{1}{K} \sum_{0 \leq r, s < K} e^{-j2\pi \frac{kr}{K}} h_{rs} e^{j2\pi \frac{s(k+d)}{K}} \quad (48)$$

$$= \frac{1}{K} \sum_{0 \leq r, s < K} e^{j2\pi \frac{k(s-r)}{K}} e^{j2\pi \frac{sd}{K}} h_{rs}.$$

Similarly, for all indices p and q, 0≤p, q≤K−1, $$e_{pq} = \frac{1}{K} \sum_{\substack{0 \leq k, m < K \\ |m-k| \leq Q}} e^{j2\pi \frac{pk}{K}} b_{km} e^{-j2\pi \frac{mq}{K}} \quad (49)$$

$$= \frac{1}{K} \sum_{\substack{0 \leq k < K \\ |d| \leq Q}} e^{j2\pi \frac{pk}{K}} b_{k,k+d} e^{-j2\pi \frac{(k+d)q}{K}}$$

$$= \frac{1}{K} \sum_{\substack{0 \leq k < K \\ |d| \leq Q}} e^{j2\pi \frac{(p-q)k}{K}} e^{-j2\pi \frac{dq}{K}} b_{k,k+d}.$$

Substituting (48) into (49), it is obtained $$e_{pq} = \frac{1}{K^2} \sum_{|d| \leq Q} \sum_{0 \leq k < K} e^{j2\pi \frac{(p-q)k}{K}} e^{-j2\pi \frac{dq}{K}} \sum_{0 \leq r, s < K} \quad (50)$$

$$e^{j2\pi \frac{k(s-r)}{K}} e^{j2\pi \frac{sd}{K}} h_{rs}$$

$$= \frac{1}{K^2} \sum_{|d| \leq Q} \sum_{0 \leq r, s < K} e^{j2\pi \frac{d(s-q)}{K}} h_{rs} \sum_{0 \leq k < K} e^{j2\pi \frac{(p-q+s-r)k}{K}}$$

$$= \frac{1}{K} \sum_{|d| \leq Q} \sum_{0 \leq s < K} e^{j2\pi \frac{d(s-q)}{K}} h_{s+p-q,s}.$$

From (50), it follows that the pth entry of the qth channel tap is given by $$e_{p,p-q} = \frac{1}{K} \sum_{|d| \leq Q} \sum_{0 \leq s < K} e^{j2\pi \frac{d(s-p+q)}{K}} h_{s+q,s} \quad (51)$$

$$= \frac{1}{K} \sum_{|d| \leq Q} e^{-j2\pi \frac{dp}{K}} \sum_{0 \leq s < K} e^{j2\pi \frac{d(s+q)}{K}} h_{s+q,s}$$

$$= \sum_{|d| \leq Q} c_{qd} e^{-j2\pi \frac{dp}{K}},$$

where $$c_{qd} = \frac{1}{K} \sum_{0 \leq s < K} e^{j2\pi \frac{d(s+q)}{K}} h_{s+q,s}. \quad (52)$$

Formula (51) shows that E is the time-domain matrix of a CE-BEM with the model order 2Q+1.

If $p \geq q+L$, then $h_{s+p-q,s}=0$ for every s, since the maximum discrete delay of the matrix H is less than L. It follows from (50), that also $e_{pq}=0$. Consequently, the matrix E has maximum discrete delay less than L. □

REFERENCES

[1] T. Zemen and C. F. Mecklenbraeuker. Time-variant channel estimation using discrete prolate spheroidal sequences. *Signal Processing, IEEE Transactions on*, 53(9):3597-3607, September 2005.

[2] Z. Tang, R. C. Cannizzaro, G. Leus, and P. Banelli. Pilot-assisted time-varying channel estimation for OFDM systems. *IEEE Trans. Signal Processing*, 55(5):2226-2238, May 2007.

[3] Zijian Tang and G. Leus. Pilot schemes for time-varying channel estimation in OFDM systems. In *Proc. IEEE Workshop on Signal Processing Advances in Wireless Communications (SPAWC'07)*, pages 1-5, Helsinki (Finland), June 2007.

[4] Changyong Shin, J. G. Andrews, and E. J. Powers. An efficient design of doubly selective channel estimation for OFDM systems. *IEEE Trans. Wireless Communications*, 6(10):3790-3802, October 2007.

[5] T. Hrycak, S. Das, G. Matz, and H. G. Feichtinger. A method for channel estimation. *Copending European Patent Application filed by the same applicant on the same day*.

[6] K. Fang, L. Rugini, and G. Leus. Low-complexity Block Turbo Equalization for OFDM Systems in Time-Varying Channels. *IEEE Transactions on Signal Processing*, 56(11):5555-5566, November 2008.

[7] H. A. Cirpan and M. K. Tsatsanis. Maximum likelihood blind channel estimation in the presence of Doppler shifts. *Signal Processing, IEEE Transactions on [see also Acoustics, Speech, and Signal Processing, IEEE Transactions on]*, 47(6):1559-1569, June 1999.

[8] M. Guillaud and D. T. M. Slock. Channel modeling and associated intercarrier interference equalization for OFDM systems with high Doppler spread. In *Acoustics, Speech, and Signal Processing, 2003. Proceedings. (ICASSP'03). 2003 IEEE International Conference on*, volume 4, pages 237-40, April 2003.

[9] G. Leus. On the estimation of rapidly varying channels. In *Proc. of the European Signal Processing Conference (EUSIPCO 2004)*, volume 4, pages 2227-2230, September 2004.

[10] T. Zemen and C. F. Mecklenbrauker. Time-variant channel equalization via discrete prolate spheroidal sequences. In *Signals, Systems and Computers, 2003. Conference Record of the Thirty-Seventh Asilomar Conference on*, volume 2, pages 1288-1292, November 2003.

[11] D. K. Borah and B. T. Hart. Frequency-selective fading channel estimation with a polynomial time-varying channel model. on *Communication, IEEE Transactions*, 47(6): 862-873, June 1999.

[12] A. P. Kannu and P. Schniter. MSE-optimal training for linear time-varying channels. In *Acoustics, Speech, and Signal Processing, 2005. Proceedings. (ICASSP'05). IEEE International Conference on*, volume 3, March 2005.

[13] A. P. Kannu and P. Schniter. Design and analysis of MMSE pilot-aided cyclic-prefixed block transmission for doubly selective channels. *IEEE Trans. Signal Processing*, 56(3):1148-1160, March 2008.

[14] T. Zemen, C. F. Mecklenbrauker, and R. R. Müller. Time variant channel equalization for MC-CDMA via Fourier basis functions. In *MC-SS Workshop 2003, Oberpaffenhofen, Germany*, pages 451-458, 2003.

[15] P. Robertson and S. Kaiser. The effects of Doppler spreads in OFDMA mobile radio systems. In *Vehicular Technology Conference, 1999. VTC 1999—Fall. IEEE VTS 50th*, volume 1, pages 329-333, Amsterdam, September 1999.

[16] Ye Li and L. J. Cimini. Bounds on the interchannel interference of OFDM in time-varying impairments. *IEEE Transactions on Communications*, 49(3):401-404, March 2001.

[17] M. Russell and G. L. Stuber. Interchannel interference analysis of OFDM in a mobile environment. In *Vehicular Technology Conference, 1995 IEEE 45th*, volume 2, pages 820-824, Chicago, Ill., July 1995.

[18] Yang-Seok Choi, P. J. Voltz, and F. A. Cassara. On channel estimation and detection for multicarrier signals in fast and selective Rayleigh fading channels. *IEEE Transactions on Communications*, 49(8):1375-1387, August 2001.

[19] X. Cai and G. B. Giannakis. Bounding Performance and Suppressing Intercarrier Interference in Wireless Mobile OFDM. *IEEE Transactions on Communications*, 51(12): 2047-2056, December 2003.

[20] A. Gorokhov and J.-P. Linnartz. Robust OFDM Receivers for Dispersive Time-Varying Channels: Equalization and Channel Acquisition. *IEEE Transactions on Communications*, 52(4):572-583, April 2004.

[21] L. Rugini, P. Banelli, and G. Leus. Simple equalization of time-varying channels for OFDM. *IEEE Communications Letters*, 9(7):619-621, July 2005.

[22] P. Schniter. Low-complexity equalization of OFDM in doubly selective channels. *Signal Processing, IEEE Transactions on [see also Acoustics, Speech, and Signal Processing, IEEE Transactions on]*, 52(4):1002-1011, April 2004.

[23] G. Taubock, M. Hampejs, G. Matz, F. Hlawatsch, and K. Gröchenig. LSQR-based ICI equalization for multicarrier communications in strongly dispersive and highly mobile environments. In *Proceedings of the 8th IEEE Workshop on Signal Processing Advances in Wireless Communications*, Helsinki, Finnland, June 2007.

[24] T. Hrycak and G. Matz. Low-complexity time-domain ICI equalization for OFDM communications over rapidly varying channels. In *Proc. Asilomar Conf. on Signals, Systems, and Computers*, pages 1767-1771, Pacific Grove (CA), Oct./November 2006.

[25] Y. Saad and M. Schultz. GMRES: A Generalized Minimum Residual Algorithm for Solving Non-Symmetric Linear Systems. *SIAM J, Scientific and Stat. Comp.*, 7:856-869, 1986.

[26] C. C. Paige and M. A. Saunders. LSQR: An Algorithm for Sparse Linear Equations and Sparse Least Square Problems. *ACM Trans. Math. Soft.*, 8:43-71, 1982.

[27] IEEE Draft Std 802.16e/D7. *Draft IEEE Standard for Local and Metropolitan Area Networks Part 16: Air Interface for Fixed and Mobile Broadband Wireless Access Systems*, 2005.

[28] Arnold Neumaier. Solving ill-conditioned and singular linear systems: A tutorial on regularization. *SIAM Review*, 40:636-666, 1998.

[29] M. K. Tsatsanis and G. B. Giannakis. Modelling and equalization of rapidly fading channels. *International Journal of Adaptive Control and Signal Processing*, 10:159-176, 1996.

[30] G. B. Giannakis and C. Tepedelenlioglu. Basis expansion models and diversity techniques for blind identification and equalization of time-varying channels. In *Proc. IEEE, pages* 1969-1986, 1998.

[31] A. Bjorck. *Numerical Methods for Least Squares Problems*. SIAM, first edition, 1995.

[32] Gene Golub and Charles F. van Loan. *Matrix Computations*. 3rd ed. The Johns Hopkins University Press, 3rd ed. edition, 1996.

[33] L. Rugini, P. Banelli, and G. Leus. Low-complexity banded equalizers for OFDM systems in Doppler spread channels. *EURASIP Journal on Applied Signal Processing*, pages 1-13, 2006.

The invention claimed is:

1. A method of equalizing a signal received over a transmission channel defined by basis expansion model (BEM) coefficients of a basis expansion model of its channel taps, comprising approximately solving a relation $$y[n] = \sum_{m=0}^{M} B_m[n] \cdot \left( \sum_{l=0}^{L-1} b_{lm} x[n-l] \right) + w[n]$$

for x[n] by an iterative method,
   n being an index of time,
   y[n] being a received signal,
   x[n] being an equalized signal,
   $B_m[n]$ being the mth basis function of the basis expansion model,
   M being a model order of the basis expansion model,
   $b_{lm}$ being a BEM coefficient of the mth basis function of the lth channel tap, and
   w[n] being optional noise.

2. The method of claim 1, wherein approximately solving said relation is performed by approximately solving a matrix representation $$y = \left( \sum_{m=0}^{M-1} P_m C_m \right) x + w$$

of said relation by an iterative method,
   $P_m$ being a diagonal matrix containing the basis function $B_m[n]$,
   $C_m$ being a circulant matrix containing the mth BEM coefficients $b_{lm}$ of all channel taps, and
   w being optional noise.

3. The method of claim 2, wherein approximately solving said matrix representation is performed by utilizing a diagonal matrix $D_m$ derived from the circulant matrix $C_m$ according to the definition $$C_m = F^H D_m F,$$

F being a matrix of a Discrete Fourier Transform and $F^H$ a conjugate transpose thereof.

4. The method of claim 3, wherein the diagonal matrix $D_m$ is computed directly from a Discrete Fourier Transform of the mth BEM coefficients of all channel taps, zero-padded up to a signal length.

5. The method of claim 1, wherein an Inverse $C_0^{-1}$ of a first circulant matrix for zero order BEM coefficients is used as a preconditioner in the iterative method.

6. The method of claim 1, wherein the iterative method is a generalized minimal residual (GMRES) algorithm.

7. The method of claim 1, wherein the iterative method is an LSQR algorithm.

8. The method of claim 1, wherein the basis functions of the basis expansion model are complex exponentials.

9. The method of claim 1, wherein the basis functions of the basis expansion model are Legendre polynomials.

10. The method of claim 1, wherein the transmission format on the transmission channel is orthogonal frequency-division multiplexing (OFDM).

11. The method of claim 1, used in a decision feedback equalizer.

12. The method of claim 1, used in a turbo equalizer.

* * * * *